United States Patent [19]
Morris

[11] 3,716,255
[45] Feb. 13, 1973

[54] REMOVABLE TRAILER HITCH

[76] Inventor: Billy R. Morris, 2538 Northmoor Drive, Corona, Calif. 91720

[22] Filed: May 14, 1971

[21] Appl. No.: 143,322

[52] U.S. Cl. ..............................280/491 E, 280/502
[51] Int. Cl. ................................................B60d 1/16
[58] Field of Search......280/491, 495, 493, 494, 502, 280/415 R, 402

[56] References Cited

UNITED STATES PATENTS 2,760,789  8/1956  Wampler......................280/491 E X
3,154,204  10/1964  LaVenture......................280/402 X
3,560,024  2/1971  Abromavage......................280/502

FOREIGN PATENTS OR APPLICATIONS 500,110  12/1919  France..............................280/491 E

*Primary Examiner*—Leo Friaglia
*Attorney*—Fowler, Knobbe & Martens

[57] ABSTRACT

An easily removable trailer hitch which provides for the uniform distribution of the loading forces over the entire length of the transverse horizontal member.

10 Claims, 3 Drawing Figures

PATENTED FEB 13 1973
3,716,255
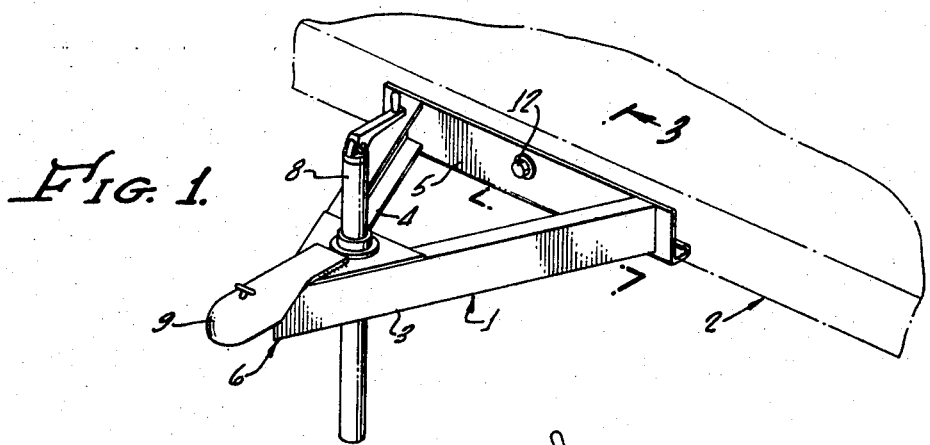
FIG. 1.
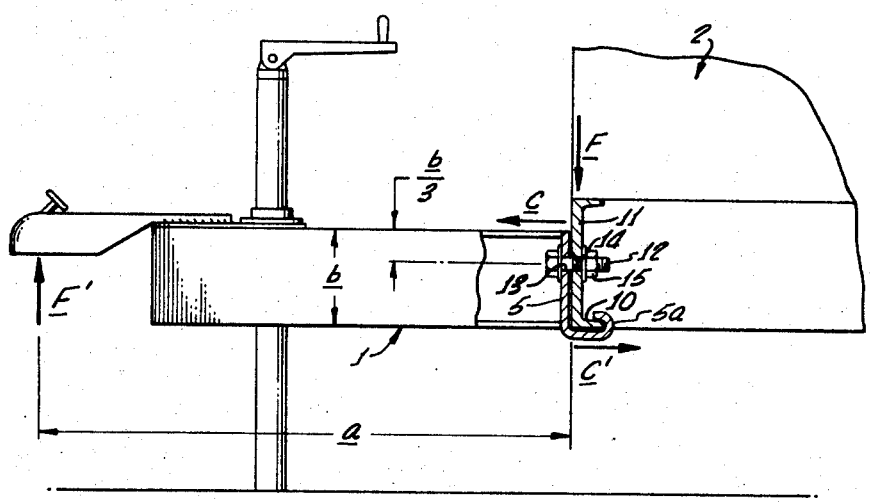
FIG. 2.
FIG. 3.
INVENTOR.
BILLY R. MORRIS
BY
FOWLER, KNOBBE
& MARTENS
ATTORNEYS.

REMOVABLE TRAILER HITCH

This invention relates to the area of couplings between vehicles, and more specifically to the area of easily removable trailer hitches.

In the prior art it has usually been found that to effect easy removability of the towing hitch it is necessary to fixedly attach one member to the towing or towed vehicle, to be left in place at all times. A ball or tongue member is then attached to the permanently affixed member whenever it is desired to accomplish a tow. The attachment of a permanent or semi-permanent member to the vehicle in such a manner results in an unsightly addition to the vehicle's appearance, and such permanent or semi-permanent members often require troublesome installation procedures as well.

Former hitches accomplish balancing of the load forces and moments through application of opposing forces which are distributed over very small areas. For example, in some of these hitches the trailer loading forces are resisted solely by a couple whose tension moment is applied through a small number of bolts, thus making early breakdown likely.

It is highly desirable in a device of this kind that it be easily removable from the vehicle when not required for towing. Many of the so-called easily removable devices of the prior art are, in reality, quite bothersome to remove. A case in point would be a hitch that requires the removing of a plurality of bolts before it can be detached.

Thus it can be seen that any truly easily removable trailer hitch should satisfy the following requirements: (1) it should allow easy and rapid attachment or detachment and should not require the semi-permanent attachment of a second member; (2) the loading should be distributed over as wide an area as is practical, to eliminate unnecessarily concentrated stresses and, concomitantly, the greater likelihood of device failure: (3) the loading force should be counteracted by as small resisting forces as possible.

In addition to the design and engineering features of the prior art which are overcome by the present invention, this invention presents an opportunity for substantial cost to trailer manufacturers without sacrificing product quality. Conventionally, trailer hitches are built as a part of the trailer and the cost of each hitch is part of the cost. While the cost of a single hitch is not a substantial part of the overall cost of the trailer, the cost amounts to very substantial amounts of money in the operation of a trailer factory. It will be apparent that if, as demonstrated herein, a fixed hitch is not required, the money now being spent on fixed hitches is essentially wasted.

Virtually all trailers are now moved only by professional movers. All that is required to abrogate the necessity of fixed trailer hitches is to provide one hitch for the mover which can be used with different trailers. Thus, according to this invention, the wasted cost of fixed trailer hitches on trailers is avoided, with consequent savings to the manufacturer and purchaser.

Most trailers include transverse floor beams which typically take the form of channel beams, that is, beams having a central portion, or web, perpendicularly attached to the edges of which are side portions, or webs. The channel beams are usually arranged with their central web disposed vertically to support the weight of the trailer components. Typically the forwardmost one of these channel beams is disposed so that the channel between the side webs thereof faces the center of the vehicle, to enhance the outside appearance.

The present invention takes advantage of these typical trailer features by comprising a hitch assembly wherein, in the preferred embodiments, the actual hitching member is a transverse, horizontally disposed, elongate beams, a first portion of which is formed to engage the lower side web of the forwardmost trailer transverse channel beam over an extended length. A second portion of said elongate beam abuts the central web of the forwardmost trailer transverse member.

Attachment of this hitch to the vehicle to be towed is accomplished simply by placing the first portion of the elongate beam over the lower side web of the trailer channel beam and then lifting the hitch up until the second portion thereof abuts the central web of the trailer transverse channel beam. The hitch may then be secured in this locked position by a fastening device which bears no load during normal usage of the hitch, and may therefore take form of any quickly releasable fastener. Neither attachment nor removal of the present hitch requires the use of any permanently or semipermanently affixed members, or any special tools.

In operation, the towing force is transmitted to the trailer by the contact of the first portion of the elongate beam with the lower side web of the trailer channel beam. A downward force on the hitch is typically used to transmit a portion of the weight of the towed vehicle to the towing vehicle, thereby assuring that the rear end of the towing vehicle has sufficient traction. This downward force on the trailer hitch, typically less than 200 pounds is balanced by the linearly distributed force exerted on the first portion of the elongate beam, coupled with the linearly distributed compressive force exerted by the trailer channel beam against the second portion of the elongate beam. Thus it is seen that both forces of the applied balancing couple are distributed over a substantial transverse length of the elongate beam and the trailer channel beam.

These, and other advantages of the present invention, are better understood with reference to the drawings, in which:

FIG. 1 is a perspective view of the trailer hitch of the present invention, installed on a trailer;

FIG. 2 is a side elevation, section along lines 2—2 of FIG. 1, of the trailer hitch of FIG. 1 during installation thereof on a trailer;

FIG. 3 is sectional elevation view taken along the same lines as FIG. 2, showing the operative relationship between the hitch of FIG. 1 and the trailer channel beam.

Referring now to FIG. 1, there is shown a trailer hitch 1 secured to a trailer 2, shown generally in dotted lines. A right channel beam 3 and a left channel beam 4 are attached to an elongate hitching beam, which in the preferred embodiment is an angle iron 5, in such a manner that they both extend from the angle iron 5 and meet to form a vertex 6. Affixed in a well known manner to the right and left channel members 3 and 4 and proximate vertex 6 is a metal plate 7. A coach jack 8 passes through the plate 7 and is affixed thereto in some convenient manner. Also attached to the plat 7 in a well known manner is coach hitch 9, of the standard type used to accommodate tow hitch balls.

FIG. 2 shows the trailer hitch 1 disposed, as a first step in the installation thereof, in such a manner that an angle iron hook 5a of angle iron 5 may be brought into hooking relationship with the lower side web 10 of the trailer transverse support beam, which in the preferred embodiment takes the form of trailer channel beam 11, but which may take various forms having a rearward pointing horizontal section on the bottom of a vertical section.

In the position depicted in FIG. 2, trailer hitch 1 is lifted to rotate about the hook 5a to the position shown in FIG. 3. In this position the fastener, which in the preferred embodiment takes the form of the bolt 12, is passed through a pair of corresponding holes 13 and 14 of the angle iron 5 in the channel beam 11, respectively, and secured tightly by a nut 15.

Since, in operation, the trailer 2 presents a downward force on the hitch 1, the pulling force exerted by the towing vehicle is usually transmitted to the trailer channel beam 11 through the angle iron hook 5a. Bolt 12 is used mainly to secure the hitch to the trailer channel beam; that is, the bolt 12 does not itself receive any substantial horizontal pulling force.

The downward force of the trailer 2 on the hitch 1, mentioned above, requires that the joint between the angle iron 5 and the channel beam 11 be capable of supporting a bending, or rotational, moment in addition to the towing force. For example, assume that the distance labeled $a$ is 3 feet. Assume also that force F, representing that portion of the trailer weight supported by the channel beam 11, as shown in FIG. 3, has a magnitude of 100 pounds. This would require that force F', the vertical supporting force, also equal 100 pounds, if static conditions are to obtain. Therefore, the couple F-F', equal to (3 feet) (100 pounds) = 300 foot-pounds, acts to rotate the trailer hitch 1 in a clockwise direction. The only forces available to counteract this moment, and to thus assure stability, are those of the second couple provided by the interaction of trailer channel beam 11 with angle iron 5. As shown in FIG. 3, a forwardly directed force C is felt all along the top edge of angle iron 5; and an equal, oppositely directed force C' is exerted by the lower outside web 10 of the channel beam 11 against the inner part of the angle iron hook 5a along the entire length of the angle iron 5. The magnitude of the stabilizing couple thus described must be such as to exert an oppositely directed moment equal in magnitude to that exerted by the couple F-F'. For example, if the angle iron 5 is one-half foot in height (the dimension $b$), then the magnitudes of C and C' must be given by $.5C = 5C' = 300$. Therefore, $C = C' = 600$ pounds. Comparing this result with the forces F - F', it can be seen that the forces of this second couple are most critical, in that any reduction of these forces is significant.

For purposes of illustration, assume a hitch wherein the general shape is the same and the dimensions are identical to those of the preferred embodiment as given above, but wherein the bolt 12, rather than the hook 5a, is employed to secure the hitch 1 against tensional strain. If the bolt 12 is spaced from the top of the angle iron 5 by two inches, the distance $b/3$, magnitudes of forces analogous to C and C' would be equal to $300/(1/6) = 1,800$ pounds. Thus it is seen that the bolt 12 absorbs the entire force of the stabilizing couple in what is a concentrated force situation. In the present hitch, however, the stabilizing force is distributed evenly along two relatively lengthy horizontal lines, one being the forward facing portion of angle iron hook 5a, and the other being the line of contact between the top of the angle iron 5 and the channel beam 11.

The present invention also differs from the previous art in that the prior hitches typically utilize a stabilizing moment derived from oppositely directed vertical forces. The present invention, on the other hand, capitalizes on the fact that trailers are normally constructed with a transverse channel beam, or the equivalent, as defined above, at the leading edge thereof. For greater support of the trailer load, these beams are usually oriented with the central web in a vertical plane. By using the channel beam to support the present hitch in an easily removable manner, and by using the width of the channel beam to absorb the linearly distributed horizontal compressive and tensional balancing forces, the couple forces required to counteract the bending moment may be reduced without adversely effecting the easy removability of the hitch.

I claim:

1. A detachable hitch apparatus for towing a trailer comprising:
   a. a transverse, horizontally disposed elongate beam having, in operating position, a vertical portion connected to a rearward extending horizontal portion, the horizontal portion including an up-bent, hook-shaped portion extending lengthwise along a substantial length of the elongate beam;
   b. means for securing the elongate beam in horizontal position to a rearward-opening channel beam of a trailer disposed with the central web of the channel beam in a vertical plane; and
   c. means for securing the elongate beam to a towing vehicle.

2. The detachable trailer hitch apparatus of claim 1, in which the towing vehicle securing means comprises:
   a. two generally forward pointing, horizontal, rigid members attached to the elongate beam near the ends thereof, the ends of which meet to form a vertex and are secured rigidly to each other at the vertex; and
   b. a coach hitch affixed to the two forward pointing members near the vertex thereof.

3. The detachable trailer hitch apparatus of claim 1 in combination with a rearward-opening trailer channel beam which trailer channel beam comprises a central vertical web and upper and lower horizontal side webs, in which the trailer hitch is secured to the trailer channel beam in such a manner that the hook-shaped portion of the trailer hitch is in hooking relationship with the lower side web of the trailer channel, beam, and the vertical portion of the elongate beam of the trailer hitch abuts the vertical central web of the trailer channel beam, so that a stabilizing couple, which counteracts a rotational moment due to the trailer weight, is exerted on the elongate beam of the trailer hitch at the following locations:
   a. a rearwardly directed force against the inside of the hook-shaped portion, distributed uniformly over the entire transverse horizontal line of contact between the inner hook surface and the rear vertical surface of the lower side web of the trailer channel beam; and b. a forwardly directed force against the rear of the top edge of the elongate beam, distributed uniformly along the entire transverse line of contact between the top edge of the elongate beam and the front surface of the trailer channel beam.

4. A detachable hitch apparatus for towing a trailer comprising a transverse channel beam which further comprises a central vertical web and upper and lower horizontal side webs opening rearward, which detachable hitch apparatus comprises:

a. a first portion which abuts the central web over a substantial portion thereof so as to transmit compression forces thereto in a uniformly distributed manner; and b. a second portion which interlocks with the lower side web of the trailer channel beam over a substantial portion thereof so as to transmit tension forces thereto in a uniformly distributed manner.

5. The detachable trailer hitch apparatus of claim 4, in which the first portion comprises a transverse, horizontally disposed, elongate beam.

6. The detachable trailer hitch apparatus of claim 5, in which the second portion comprises a transverse, lengthwise extending hooked element.

7. A detachable hitch for towing a trailer comprising a transverse channel beam which further comprises a central vertical web and upper and lower horizontal side webs opening rearward, and which hitch comprises a first portion which abuts the central web of the trailer channel beam over a substantial portion thereof and a second portion which interlocks with the lower side web of the trailer channel beam over a substantial portion thereof, so as to distribute over a substantial portion of the length of the trailer channel beam all forces of a stabilizing couple, the stabilizing couple being that couple which counteracts the rotational moment exerted on the trailer hitch apparatus due to the weight of the trailer, which forces of the stabilizing couple are present during normal operating conditions.

8. A detachable hitch for towing a trailer comprising a transverse channel beam which further comprises a central vertical web and upper and lower horizontal side webs opening rearward, and which hitch comprises:

a. am elongate beam, a vertical portion of which abuts the transverse channel beam;

b. an up-bent hook-shaped portion, the concave section of which opens in a forward direction relative to the direction of travel, and which extends lengthwise over a substantial portion of the elongate beams and is attached thereto;

c. a bolt which extends through corresponding holes in the transverse channel beam and the vertical portion of the elongate beam; and d. a nut for securing the elongate beam into abutting relationship with the transverse channel beam.

9. A detachable hitch for towing a trailer comprised of a rearward-opening transverse channel beam, said channel beam further comprising a vertically disposed central web and upper and lower horizontal side webs, and said trailer hitch comprising an elongate beam, a vertical portion of which abuts the transverse channel beam, and an up-bent hook-shaped portion, the concave section of which opens in a forward direction relative to the direction of travel, and which extends lengthwise over a substantial portion of the elongate beam and is attached thereto, in which trailer hitch all tension forces required to counterbalance the rotational moment exerted on the trailer hitch apparatus due to the trailer weight are distributed over a substantial length of the transverse channel beam.

10. The easily detachable trailer hitch apparatus of claim 7, in which:

a. the first portion comprises an elongate beam, a vertical portion of which abuts the trailer channel beam; and b. the second portion comprises an up-bent hook-shaped portion, the concave section of which opens in a forward direction relative to the direction of travel, and which extends lengthwise over a substantial portion of the elongate beam and is attached thereto.

* * * * *